Figure 1:
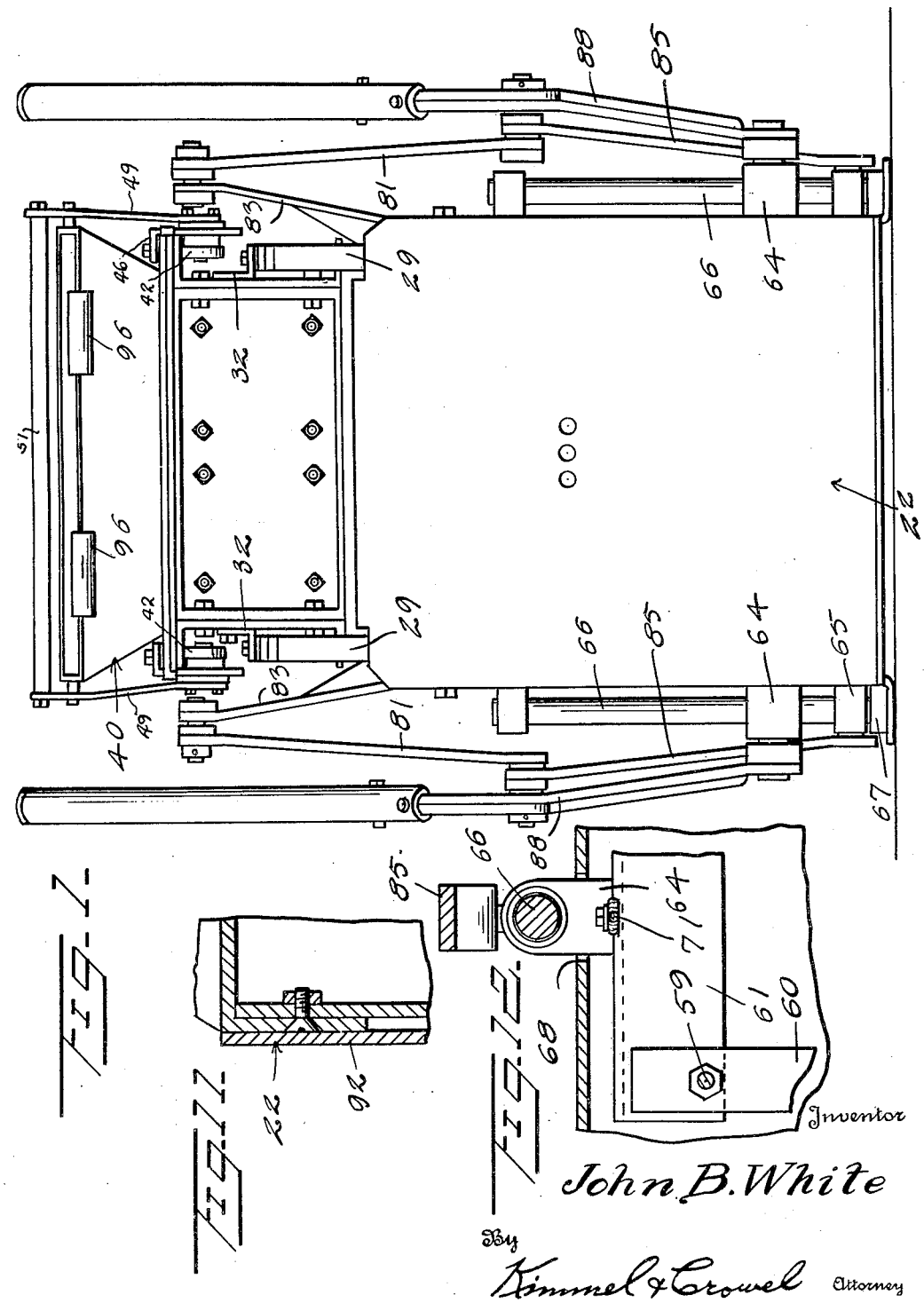

Nov. 7, 1950 J. B. WHITE 2,528,931
CONCRETE BLOCK MOLDING MACHINE
Filed Nov. 18, 1946 7 Sheets-Sheet 1

Inventor
John B. White
By
Kimmel & Crowel Attorney

Nov. 7, 1950     J. B. WHITE     2,528,931
CONCRETE BLOCK MOLDING MACHINE
Filed Nov. 18, 1946     7 Sheets-Sheet 3

Inventor
John B. White
By Kimmel & Crowell Attorneys

Nov. 7, 1950  J. B. WHITE  2,528,931
CONCRETE BLOCK MOLDING MACHINE
Filed Nov. 18, 1946  7 Sheets-Sheet 6

Inventor
John B. White
By
Kimmel & Crowell Attorneys

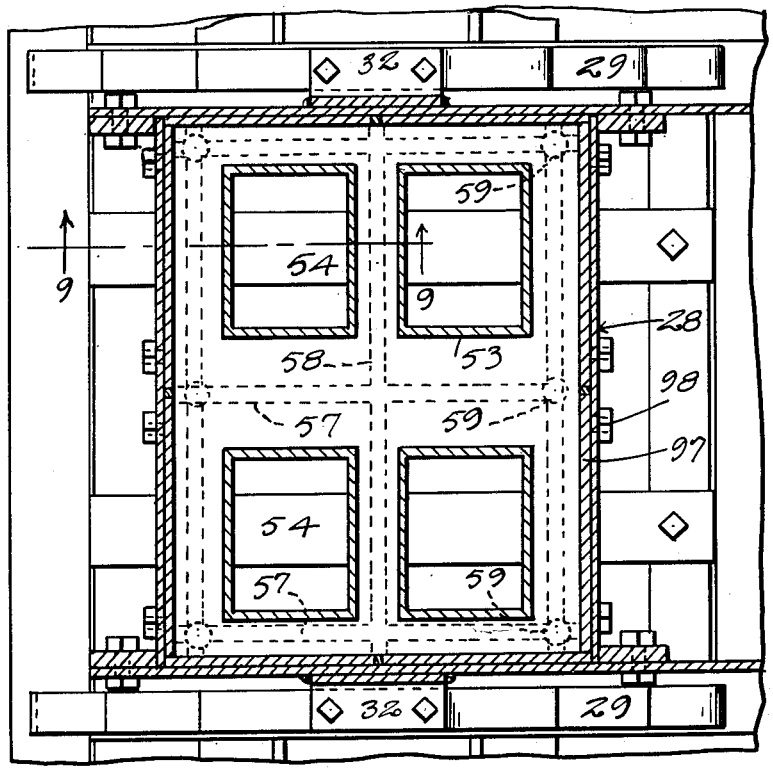
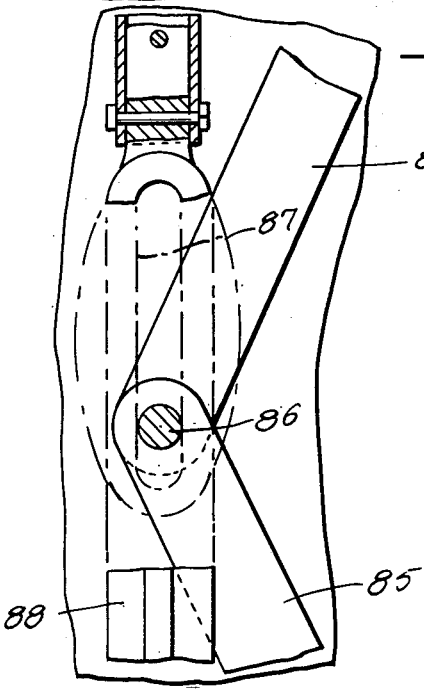
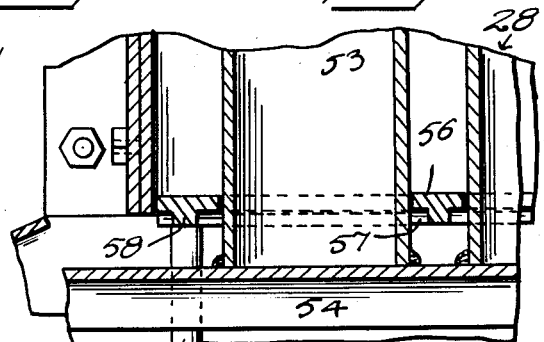

Patented Nov. 7, 1950

2,528,931

UNITED STATES PATENT OFFICE 2,528,931

CONCRETE BLOCK MOLDING MACHINE

John B. White, West Springfield, Mass.

Application November 18, 1946, Serial No. 710,630

5 Claims. (Cl. 25—41)

This invention relates to a concrete block molding machine.

An object of this invention is to provide a cement block making machine which is manually operable and includes an improved means for ejecting the block from the mould.

Another object of this invention is to provide in a machine of this kind, an improved elevating and ejecting means for removing the formed block which will provide an initial high pressure for breaking contact between the block and the mould and cores.

A further object of this invention is to provide in a machine of this type, an improved slidable hopper with means for locking the hopper in either operative or inoperative position.

A further object of this invention is to provide in combination with a machine of this kind, an improved electrical vibrator whereby the plastic concrete will be compacted.

With the above and other objects in view, my invention consists in the arrangement, combination and details of construction disclosed in the drawings and specification, and then more particularly pointed out in the appended claims.

Figure 2:
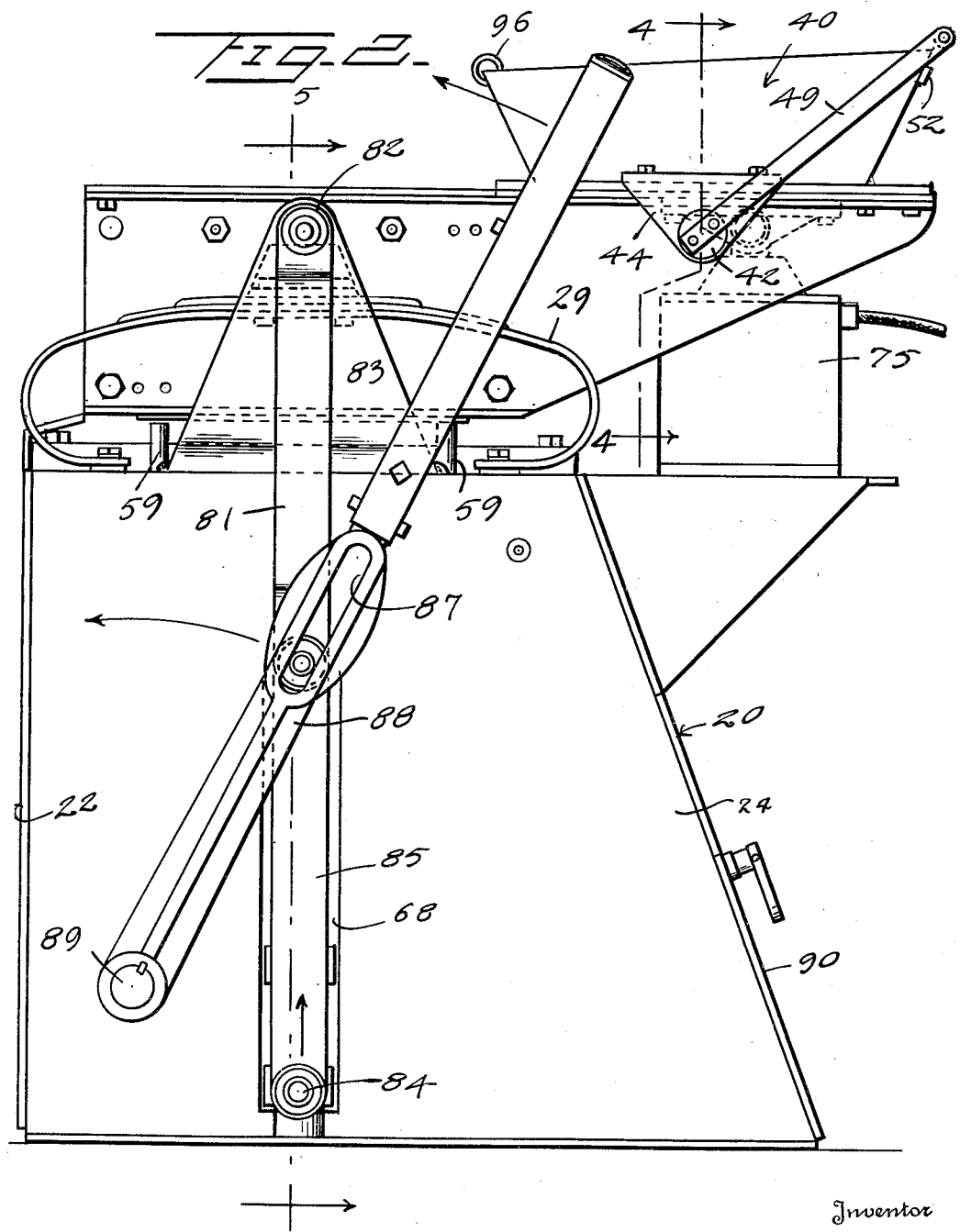
Figure 3:
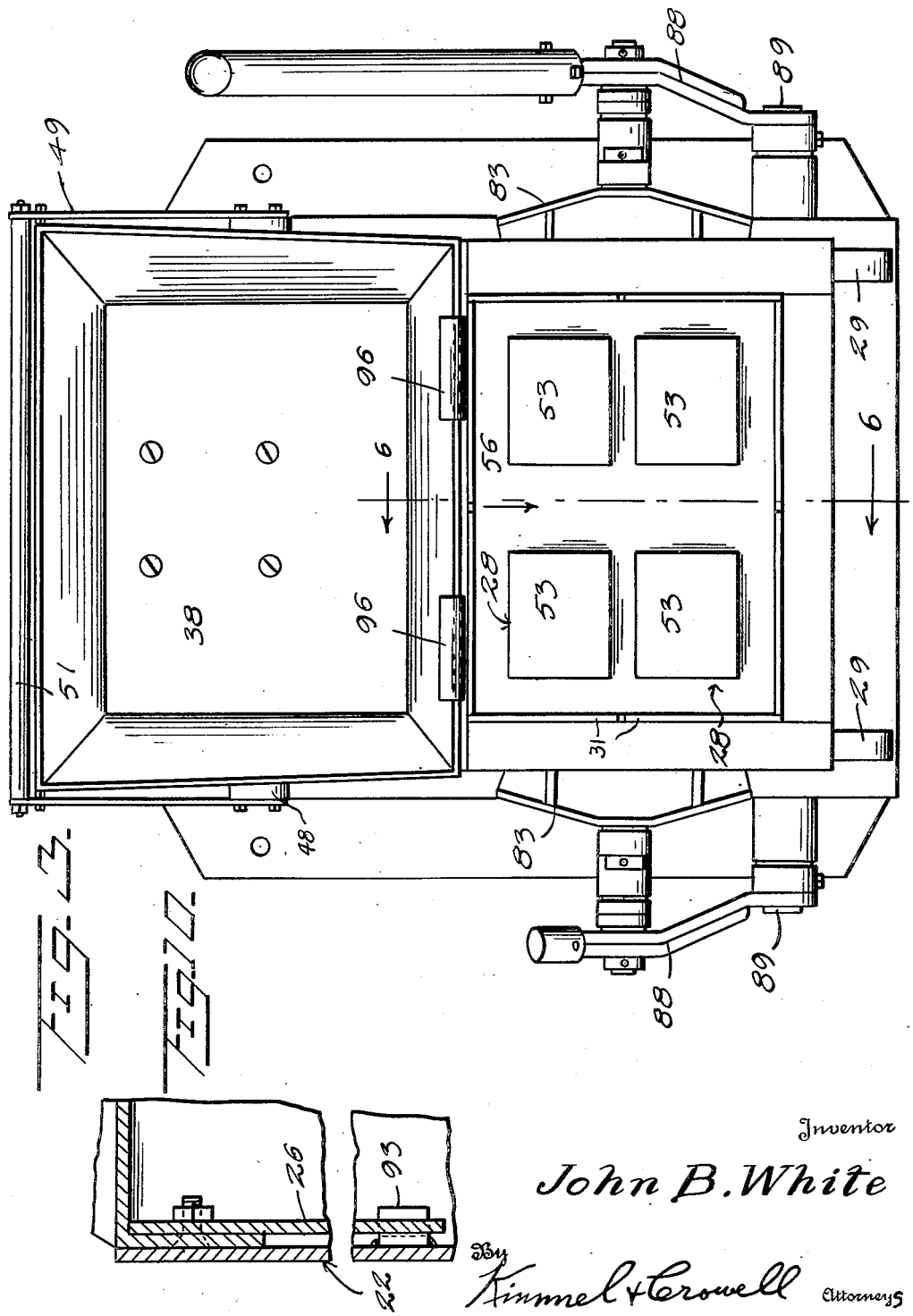
Figure 4:
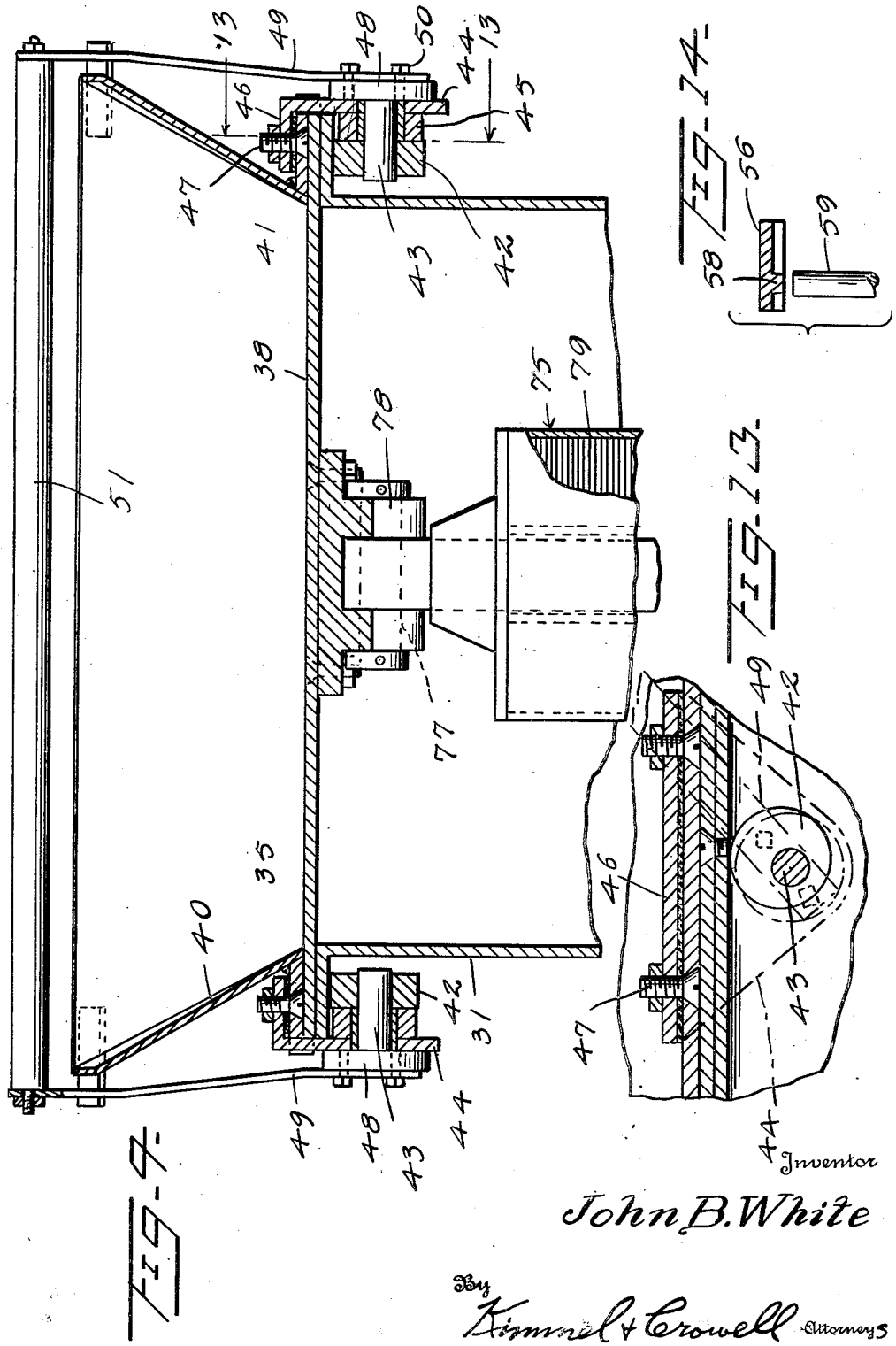
Figure 5:
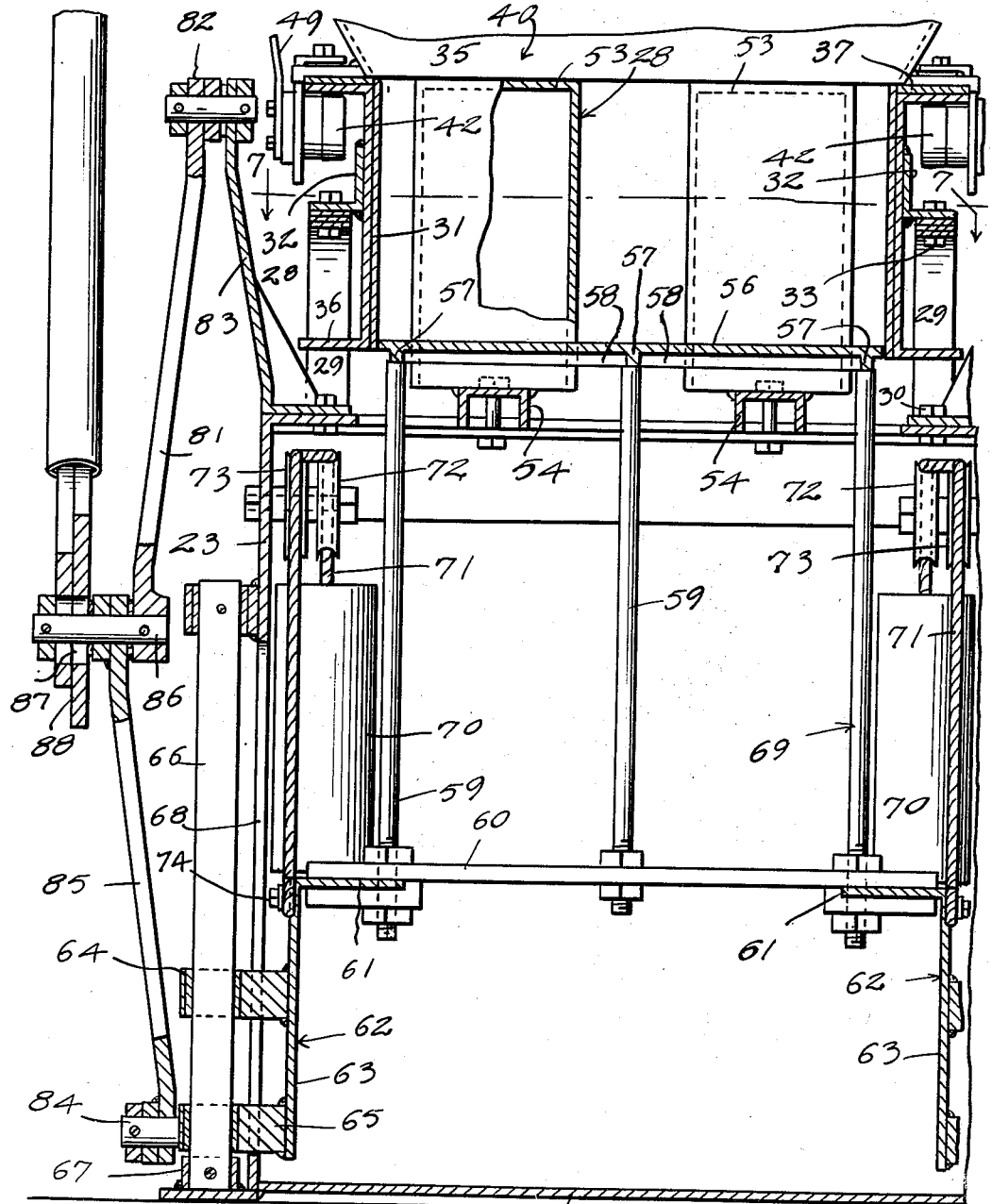
Figure 6:
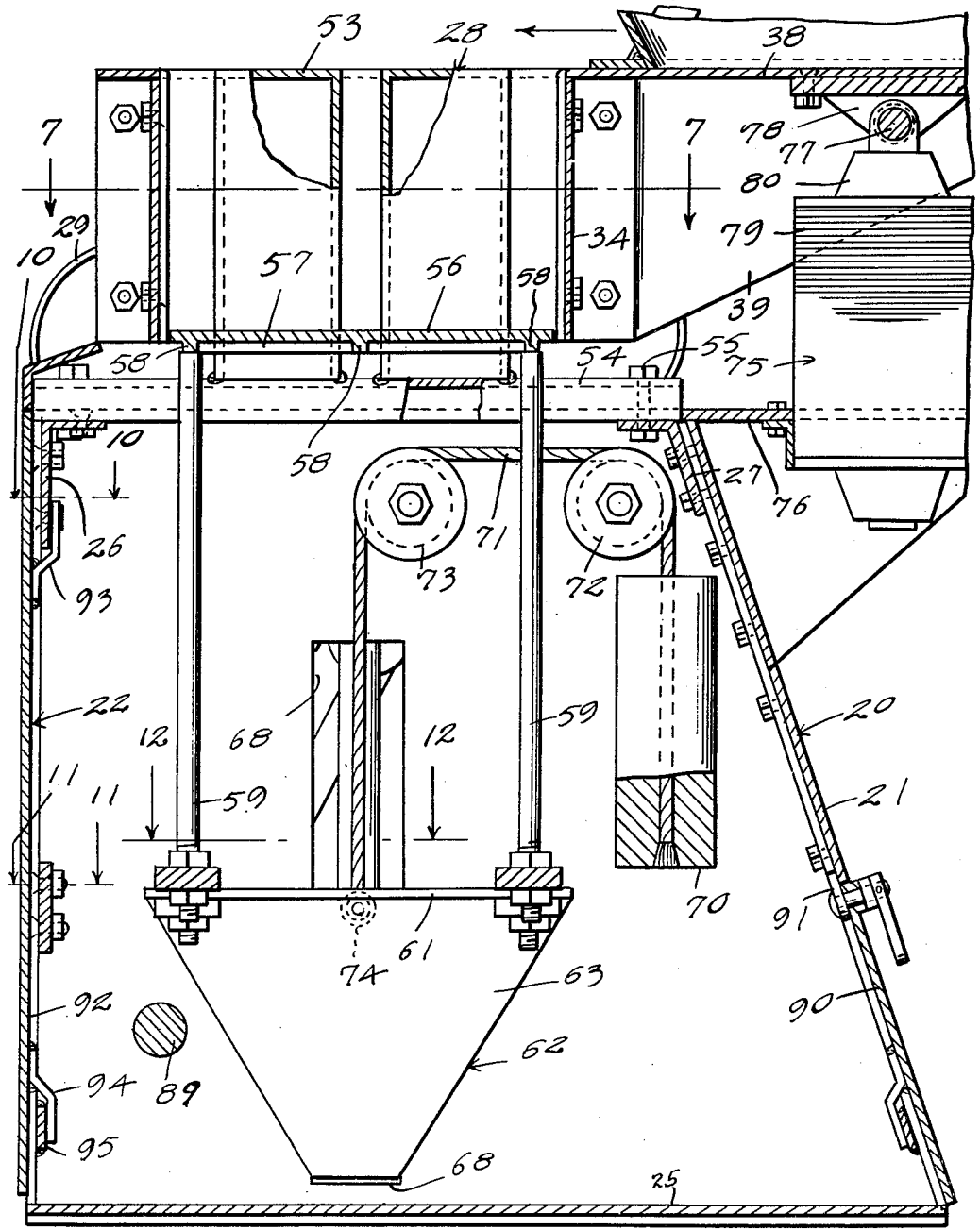

In the drawings,

Figure 1 is a detail front elevation of a concrete block making machine constructed according to an embodiment of this invention, Figure 2 is a detail side elevation of the device, Figure 3 is a plan view of the device, Figure 4 is a fragmentary sectional view taken on the line 4—4 of Figure 2, Figure 5 is a fragmentary sectional view taken on the line 5—5 of Figure 2, Figure 6 is a fragmentary sectional view taken on the line 6—6 of Figure 3, Figure 7 is a fragmentary sectional view taken on the line 7—7 of Figure 6, Figure 8 is a fragmentary side elevation, partly broken away and in section, of the pallet operating linkage, Figure 9 is a fragmentary sectional view taken on the line 9—9 of Figure 7, Figure 10 is a fragmentary sectional view taken on the line 10—10 of Figure 6, Figure 11 is a fragmentary sectional view taken on the line 11—11 of Figure 6, Figure 12 is a fragmentary sectional view taken on the line 12—12 of Figure 6, Figure 13 is a fragmentary sectional view taken on the line 13—13 of Figure 4, Figure 14 is a fragmentary exploded sectional view showing the pallet and the operating pins or rods therefor.

Referring to the drawings, the numeral 20 designates generally a hollow base which is formed of front and rear walls 21 and 22, opposite side walls 23 and 24 and a bottom wall 25. The base 20 has extending transversely thereof at the upper end, angle members 26 and 27. A mould generally designated as 28 is disposed above the base 20 and is yieldably supported on a pair of bowed springs 29. The springs 29 have their lower ends secured by fastening members 30 to the upper end of the base 20, and the opposite end walls 31 of the mould 28 have angle members 32 secured thereto.

The bowed intermediate portions of the springs 29 are secured to the lower sides of the angle members 32 by fastening members 33. The mould 28 also includes opposite sides 34 and preferably the opposite ends are formed of horizontal channel members having upper and lower flanges 35 and 36 respectively. The upper angle members 26 and 27 have fixed thereto a pair of elongated rail forming bars 37 which have formed integral with their rear ends a plate 38. The plate 38 extends rearwardly of the mould box 28 and is supported rearwardly of the mould box by means of bracket members 39.

The plate 38 forms a closed stationary bottom wall for a movable hopper generally designated as 40. The hopper 40 has an open lower end tapering downwardly and inwardly and laterally projecting flanges 41 extend from the opposite lower sides of the hopper and slidably engage the plate 38 when the hopper is in inoperative position, and slidably engage the rails 37 when the hopper is moved forwardly to delivering or operative position.

In order to provide a means whereby the hopper may be readily pulled forward and locked in either its forward or rearward position, I have provided a pair of locking cam members 42 which are mounted on stub shafts 43. The shafts 43 are journaled through the vertical side 44 of a bearing bracket which also includes a spacer bushing 45 interposed between the cam 42 and the vertical bracket side 44. The bracket 44 also includes an upper horizontal side 46 engaging over the flange 41 and secured thereto by means of one or more fastening members 47.

As shown in Figure 13, the vertical bracket side 44 is of substantially triangular configuration. The stub shaft 43 has a head 48 fixed to the outer end thereof and the lower end of a locking lever 49 is fixed to the head 48 by fastening members 50. There are two of these cams 42, as shown in Figure 4, and two operating levers 49 which are connected together by means of a connecting bar 51 which constitutes an operator by means of which both levers 49 can be operated together.

The rearward swinging of the levers 49 is limited by means of stop members 52 which are carried by the hopper 40. The mould box 28 has disposed therein pairs of hollow core members 53. The core members 53 extend downwardly through the mould box and are fixedly secured to inverted U-shaped supporting bars 54 fixed by fastening members 55 to the supporting angle members 26 and 27. A removable pallet 56 loosely engages within the mould box 28, being provided with openings through which the core members 53 loosely engage. The pallet 56 has formed integral with the lower side thereof intersecting ribs 57 and 58.

The pallet 56 is supported in operative position at the lower end of the mould box 28 upon a plurality of combined pallet supporting and ejecting rods or pins 59. The pallet supporting and ejecting members 59 are secured to a pair of transversely extending bars 60 which at their opposite ends are secured to the horizontal upper side 61 of an angle shaped slide 62. The slide 62 includes a vertical side 63 having extending outwardly therefrom a pair of slide blocks 64 and 65. The slide blocks 64 and 65 slidably engage vertically disposed guide bars 66 which at the lower and upper ends are fixed in stationary bushings 67 carried by the base 20, and the side of the frame.

The opposite side walls of the base 20 are formed with elongated slots 68 through which the blocks 64 and 65 loosely engage. The pallet supporting and ejecting member generally designated as 69 and which comprises the bars 59 and 60, together with the slides 62, is counterbalanced within the base 20 by means of weights 70. The weights 70 have secured to their upper ends cables 71 which are trained over a pair of pulleys 72 and 83 and the cables 71 are then extended downwardly and secured by fastening means 74 to the slide members 62.

In order to provide for the compacting of the plastic cement after the cement has been discharged into the mould box 28, I have provided an electric vibrator 75 which is carried by a support bracket 76 secured to the base 20, and connected by means of a pin 77 to a depending bracket 78 which is fixed to the lower side of the plate 38. The electric vibrator 75 is of the solenoid type, which includes a coil 79 and a vibrating core 80. After the cement has been compacted in the mould box 28 and the cement has initially set, the cement block is removed by means of a pallet elevating construction which includes an upper link 81 pivotally secured as at 82 to an upwardly extending supporting bracket 83 which is fixed to the base 20. The lower slide block 65 has extending outwardly therefrom a pin or stud 84 with which the lower end of a movable link 85 is pivotally connected. The upper end of the link 85 is also pivotally connected to a pin 86 which engages through the lower end of the stationary link 81 and the pin 86 extends outwardly through an elongated slot 87 which is formed in an elongated lever 88. The lever 88 is fixedly secured at its lower end on a shaft 89 which may extend through the base so that the two operating levers will work as a unit.

The base 20 may include removable plates 90 on the rear side thereof, and 92 on the forward side thereof. The rear plate or closure 90 is adapted to be locked by means of a latching member 91 and the closure plate 92 is adapted to be removably secured to the front of the base 20 by means of offset upper and lower lugs 93 and 94 which engage the vertical side of the angle member 26 and a lower horizontal bar 95 respectively.

In the use and operation of this machine, the hopper 40 may be pulled forwardly by grasping the handle 96, which is carried by the forward end of the hopper, the cam levers 49 at this time being in their rearmost released position. The hopper 40 is pulled over the mould box 28 and at this time the cam levers 49 are pulled forwardly to lock the hopper over the mould box. The plastic concrete is then poured into the hopper, the mould box being filled and the excess of concrete will be disposed in the lower portion of the hopper 40.

The vibrator 75 is then operated to compact the plastic concrete and when the concrete has been compacted to the desired degree, the hopper 40 may be moved rearwardly to inoperative position. The rearward movement of the hopper 40 to its inoperative position will scrape the excess concrete projecting above the mould box 28 and this excess will be carried onto the plate 38. At the time the mould box is receiving the concrete, the links 81 and 85 will be disposed in alignment, as shown in Figure 2.

After the concrete has set to the desired degree where the now formed blocks may be removed from the mould box, the levers 88 are rocked forwardly. Forward rocking of the levers 88 will cause link 85 to be pulled upwardly at its lower end, thereby moving the slide member 62 and causing the pallet supporting pins or bars 59 to push the pallet 56 upwardly.

By providing the link elevator for the pallet as hereinbefore described, initial high leverage will be obtained to break the contact of the block with the walls of the mould box. After the block has been loosened from the box 28, the further elevating of the block is relatively easy, assisted by the two counterweights, and is obtained by further forward swinging of the elevating levers 89 which will dispose the links 81 and 85 on obtuse angles relative to each other.

Where it is desired to form smaller blocks than will be provided by the mould box 28, end plates 34 and liner plates 97 may be disposed on the inside of the box 28, as shown in Figure 7. These end and liner plates may be secured to the inside of the box 28 by fastening members 98.

I do not mean to confine myself to the exact details of construction herein disclosed, but claim all variations falling within the purview of the appended claims.

What I claim is—

1. A cement block making machine comprising a base, a mould member, means yieldably supporting said mould member on said base, core means, means supporting said core means on said base, a pallet loosely engageable in said mould member, combined pallet supporting and elevating means movably carried by said base, and means for raising or lowering said elevating means, said latter means including pairs of pivotally connected links disposed in substantially vertical position, means fixed to said base pivotally connected to the uppermost ones of said links, means pivotally connecting the lowermost ones of said links to said pallet supporting and elevating means, and a pair of operating levers pivotally connected to said base and formed with elongated slots engageable with the pivotal connections between said links for effecting angular movement of said pairs of links and vertical movement of said supporting and elevating means.

2. A cement block making machine comprising a base, a mould member, means yieldably supporting said mould member on said base, means for vibrating said mould member, core means, means supporting said core means on said base, a pallet loosely engageable in said mould member, combined pallet supporting and elevating means movably carried by said base, and means for raising or lowering said elevating means, said latter means including pairs of pivotally connected links disposed in substantially vertical position, means fixed to said base pivotally connected to the uppermost ones of said links, means pivotally connecting the lowermost ones of said links to said pallet supporting and elevating means, and a pair of operating levers pivotally connected to said base and formed with elongated slots engageable with the pivotal connections between said links for effecting angular movement of said pairs of links and vertical movement of said supporting and elevating means.

3. A cement block making machine comprising a base, a mould member, means yieldably mounting said mould member on said base, and means for ejecting the block from said mould member, said ejective means including a pair of vertically movable slides, guide means for said slides carried by said base, a pair of pivotally connected slide suspension links for each slide, means pivotally supporting the uppermost of said links from said base, means pivotally connecting the lowermost link of each pair to the related one of said slides, and means for varying the angular relation of the members of each pair of links to thereby vertically move said slides.

4. A cement block making machine comprising a base, a mould member, means yieldably mounting said mould member on said base, means for vibrating said mould member, and means for ejecting the block from said mould member, said ejective means including a pair of vertically movable slides, guide means for said slides carried by said base, a pair of pivotally connected slide suspension links for each slide, means pivotally supporting the uppermost of said links from said base, means pivotally connecting the lowermost link of each pair to the related one of said slides, and means for varying the angular relation of the members of each pair of links to thereby vertically move said slides.

5. A cement block making machine comprising a base, a mould member, means yieldably mounting said mould member on said base, and means for ejecting the block from said mould member, said ejective means including a pair of vertically movable slides, guide means for said slides carried by said base, a pair of slide suspension links for each slide, means pivotally supporting the uppermost of said links from said base, means pivotally connecting the lowermost link of each pair to the related one of said slides, and means for varying the angular relation of the members of each pair of links to thereby vertically move said slides, each pair of links including an elongated pivot connecting said links together, and said latter named means including a pair of rock levers pivotally mounted on said base, each of said levers being formed with an elongated slot through which said pivot loosely engages.

JOHN B. WHITE.

REFERENCES CITED

The following references are of record in the file of this patent:

UNITED STATES PATENTS

| Number | Name | Date |
|---|---|---|
| 1,590,429 | Emert | June 29, 1926 |
| 2,270,829 | Wellnitz | Jan. 20, 1942 |
| 2,311,480 | Shugart et al. | Feb. 16, 1943 |

FOREIGN PATENTS

| Number | Country | Date |
|---|---|---|
| 412,893 | France | July 25, 1910 |
| 505,782 | France | Aug. 6, 1920 |